(12) United States Patent
Morena et al.

(10) Patent No.: US 11,663,637 B2
(45) Date of Patent: May 30, 2023

(54) SYSTEM AND METHOD FOR ACCESSING DATA VIA SMART ARTICLES INCLUDING PURCHASING DATA

(71) Applicant: ZAPCOW INC., Montreal (CA)

(72) Inventors: Joseph Morena, Montreal (CA); Cono Fusco, Montreal (CA); Vince Morena, Montreal (CA)

(73) Assignee: ZAPCOW INC., Montreal (CA)

( * ) Notice: Subject to any disclaimer, the term of this patent is extended or adjusted under 35 U.S.C. 154(b) by 0 days.

(21) Appl. No.: 17/782,880

(22) PCT Filed: Dec. 4, 2020

(86) PCT No.: PCT/CA2020/000133
§ 371 (c)(1),
(2) Date: Jun. 6, 2022

(87) PCT Pub. No.: WO2021/108889
PCT Pub. Date: Jun. 10, 2021

(65) Prior Publication Data
US 2023/0005031 A1 Jan. 5, 2023

Related U.S. Application Data (60) Provisional application No. 62/943,522, filed on Dec. 4, 2019.

(51) Int. Cl.
*G06Q 30/06* (2023.01)
*G06Q 30/02* (2023.01)
(Continued)

(52) U.S. Cl.
CPC ......... *G06Q 30/0601* (2013.01); *G06Q 20/30* (2013.01); *G06Q 30/0251* (2013.01);
(Continued)

(58) Field of Classification Search
None
See application file for complete search history.

(56) References Cited

U.S. PATENT DOCUMENTS 7,165,041 B1 * 1/2007 Guheen .............. G06Q 30/0601
705/26.1
10,147,128 B2 * 12/2018 Gabbai .............. G06Q 30/0625
(Continued)

OTHER PUBLICATIONS

Anon., "Barcode Hero Introduces Social Shopping Feature for iPhone and iPod Touch," Professional Services Close-Up [Jacksonville] Dec. 14, 2010. (Year: 2010).*
(Continued)

*Primary Examiner* — Nicholas D Rosen
(74) *Attorney, Agent, or Firm* — Praxis (57) ABSTRACT

A networked system comprises a main controller that allows users to act as customers, promoters or merchants of smart articles that are displayed by promoters who have purchased these articles from the merchants. The customer uses a controller device to access data from the smart article by capturing an identifying marker on the article and transmitting the foregoing data to the main controller which places the customer in communication with a merchant controller associated with the merchant from whom the promoter purchased the article. The merchant can thus provide data regarding the article to the customer via the main controller and depending on how the customer acts, the merchant can allocate a reward to the promoter via a promoter controller associated therewith.

24 Claims, 5 Drawing Sheets

(51) Int. Cl.
*G06Q 20/30* (2012.01)
*G16Y 10/45* (2020.01)
*H04L 67/12* (2022.01)
*G06Q 30/0601* (2023.01)
*G06Q 30/0251* (2023.01)

(52) U.S. Cl.
CPC .......... *G06Q 30/0257* (2013.01); *G16Y 10/45* (2020.01); *H04L 67/12* (2013.01)

(56) References Cited

U.S. PATENT DOCUMENTS

| | | | |
|---|---|---|---|
| 10,684,738 B1* | 6/2020 | Sicora | G06F 16/435 |
| 11,393,019 B2* | 7/2022 | Hirano | G06Q 30/08 |
| 2003/0120555 A1* | 6/2003 | Kitagawa | G06Q 20/32 |
| | | | 705/26.1 |
| 2015/0145671 A1* | 5/2015 | Cohen | G06Q 30/0241 |
| | | | 340/539.11 |
| 2015/0242928 A1* | 8/2015 | Gabbai | G06Q 30/0631 |
| | | | 705/26.62 |
| 2017/0140459 A1* | 5/2017 | Hirano | G06Q 20/306 |
| 2021/0358021 A1* | 11/2021 | Wickersham | H04W 52/0274 |

OTHER PUBLICATIONS

Anon., "Use price matching to avoid leaving money on the table," University Wire [Carlsbad] Oct. 6, 2016. (Year: 2016).*
Beerens, J., "Connected Packaging," Brand Packaging 22.5: 32, 34. BNP Media, (Jun. 2018). (Year: 2018).*

* cited by examiner

SYSTEM AND METHOD FOR ACCESSING DATA VIA SMART ARTICLES INCLUDING PURCHASING DATA

CROSS-REFERENCE TO RELATED APPLICATIONS

The present application claims priority on U.S. Provisional Patent Application Ser. No. 62/1,943,522 filed on Dec. 4, 2019 and incorporated herein by reference in its entirety.

TECHNICAL FIELD

The present disclosure relates to smart articles. More specifically, but not exclusively, the present disclosure relates to a system and method for accessing data via smart articles including purchasing data.

BACKGROUND

A smart article is any item that is digitally interactive via a processor or that comprises a processor for interactivity. Smart articles are integral to the Internet of Things. The Internet of Things is the interconnection via the Internet of computing devices embedded in everyday objects, enabling them to send and receive data. A smart article comprises a component for allowing operative communication with a processor. Smart articles include smart clothes which are known to monitor the physical condition of the wearer. These clothes can provide biometric data, such as pulse rate, temperature, muscle stretch, heart rhythm and physical movement, and the data are transmitted via Bluetooth to an app in real time. Other uses of smart wear include clothes with Awear Solutions' Bluetooth low-energy smart tag, connecting the product to the dedicated iOS app. Once downloaded and activated, the app creates a direct line of communication between the product and consumers. Product and app usage are incentivized with a point platform, allowing the consumer to get rewards and experiences in real time, based on how often the garment is worn or article is used if not a garment. Smart articles also include e-textiles which are fabrics that enable digital components such as batteries, lights, small computers, processors, wireless components, electronics etc. to be embedded in them.

OBJECTS

An object of the present disclosure is to provide a system for accessing data via smart articles in public spaces when in physical proximity therewith including purchasing data.

An object of the present disclosure is to provide a method for accessing data via smart articles in public spaces when in physical proximity therewith including purchasing data.

An object of the present disclosure is to provide a system for providing a network between merchants of articles, target customers for articles and promoters of articles purchased from the merchants.

An object of the present disclosure is to provide a method for providing a network between merchants of articles, target customers for articles and promoters of articles purchased from the merchants.

SUMMARY

In accordance with an aspect of the present disclosure, there is provided a system for providing a network between merchants of articles, target customers for articles and promoters of articles purchased from the merchants, the system comprising a main controller in communication with one or more target customer controllers, one or more merchant controllers and one or more promoter controllers, wherein each of the main controller, the target customer controllers, the merchant controllers and the promoter controllers are configured for such communication and respectively comprise a respective processor with a respective associated memory having a respective processor executable code stored thereon, wherein each of the target customer controllers are associated with a respective one of the target customers, each of the merchant controllers are associated with a respective one of the merchants of articles, and each of the promoter controllers are associated with a respective one of the promoters of articles. One or more markers being physically associated with articles purchased from the merchants for being displayed by the promoters, the markers being configured for being remotely captured by a capturing device when the associated article is displayed. Each of the target customer controllers being in communication with a respective input/output interface and a respective marker capturing device for providing the target customer with selectively capturing any of the markers when a given article physically associated therewith is displayed in a marker capturing proximity with the marker capturing device, each of the target customer controllers being provided by the execution of the respective processor executable code to perform computer implementable steps of: receiving the captured marker from the marker capturing device; and transmitting the captured marker to the main controller. Each of the merchant controllers being provided by the execution of the respective processor executable code to perform computer implementable steps of: providing a databank of: articles sold by the merchant associated therewith; and an association between a given purchased article sold by the merchant associated therewith and a given promoter; and communicating to the main controller: the articles sold by the merchant associated therewith; and the association between the given purchased article sold by the merchant associated therewith and a given promoter. The main controller being provided by the execution of the respective processor executable code to perform computer implementable steps of: (a) providing a databank of: (i) stored system members including the merchants of the articles with physically associated markers, the target customers for the articles with physically associated markers and the promoters of the articles with physically associated markers purchased from the merchants; (ii) stored associations between the markers and the articles physical associated therewith; (iii) stored associations between the given purchased article and the given promoter as communicated thereto by the merchant controllers, (iv) stored associations between the articles sold by the merchant and the merchant controllers associated therewith; (v) stored associations between a given one of the captured markers and the target customer associated with the target customer controller transmitting the given one of the captured markers; (b) matching the captured marker transmitted thereto to a given article purchased by a given promoter based on the stored associations of step a)(ii); (c) matching a target customer to the target customer controller associated therewith that transmitted the captured marker based on the stored associations of step a)(v); (d) matching the given article matched to the captured marker in step b) to a given promoter controller associated with a given promoter based on the stored associations of step a)(iii); (e) communicating the given article matched to the captured marker in step b) to the merchant controller associated therewith based on the stored associations of step a)(iv); wherein the merchant controller of step e) is provided by the execution of the respective processor executable code to perform computer a implementable step of selectively transmitting a communication to the target customer controller that transmitted the captured marker to the main controller that resulted in the matching of step b); wherein the target customer controller receiving the transmitted communication from the merchant controller of step e) is provided by the execution of the respective processor executable code to perform the computer implementable step of providing the target customer associated therewith to input requests via the input/output interface to the merchant controller of step e) based on the transmitted communication; wherein the merchant controller of step e) is provided by the execution of the respective processor executable code to perform the computer implementable step of selectively transmitting a communication to the promoter controller of step d) based on the input request of the target customer that transmitted the captured marker to the main controller that resulted in the matching of step b).

In an embodiment of the system, the communication selectively transmitted to the target customer controller that transmitted the captured marker to the main controller that resulted in the matching of step b) is selected from the group consisting of: data regarding the article physically associated with the captured marker, wherein the data is contained within the databank provided by the merchant controller; an offer to purchase an article contained in the databank of the articles sold by the merchant associated with the merchant controller selectively transmitting the communication, wherein the article contained in the databank is the same as, or similar to, or otherwise associated with the article physically associated with the captured marker; a discount on the offer to purchase an article contained in the databank of the articles sold by the merchant associated with the merchant controller selectively transmitting the communication; an offer for the target customer to input a given request; and any combination thereof.

In an embodiment of the system, the communication transmitted by the merchant controller of step e) to the promoter controller of step d) based on the input request of the target customer that transmitted the captured marker to the main controller that resulted in the matching of step b) is selected from the group consisting of: communicating an allotment of points to the promoter; communicating an allotment of monetary funds to the promoter; communicating an allotment of virtual currency to the promoter; and any combination of the foregoing.

In an embodiment of the system, the input request of the target customer that transmitted the captured marker to the main controller that resulted in the matching of step b) is selected from the group consisting of: a request for data regarding the article physically associated with the captured marker, wherein the data is contained within the databank provided by the merchant controller; a request to purchase an article sold by the merchant associated with the merchant controller of step e); a request to rate the article physically associated with the captured marker; and any combination of the foregoing.

In an embodiment of the system, the promoter controller is provided by the execution of the respective processor executable code to perform the computer implementable step of transmitting a signal to potential ones of the target customer controllers within a predetermined vicinity. In an embodiment of the system, the signal comprises a communication regarding the presence of the signal transmitting promoter being in the predetermined vicinity. In an embodiment of the system, the communication is indicative of additional information selected from the group consisting of the type of article being promoted by the signal transmitting promoter, a given amount of articles being promoted by the signal transmitting promoter, a price range of articles being promoted by the signal transmitting promoter, rewards associated with the purchase of articles being promoted by the signal transmitting promoter and any combination thereof. In an embodiment of the system, the predetermined vicinity is stored within the memory of the promoter controller. In an embodiment of the system, the predetermined vicinity is stored within the memory of the main controller. In an embodiment of the system, the main controller is provided by the execution of the respective processor executable code to perform computer implementable step of receiving the signal being transmitted the potential target customer controllers by the promoters. In an embodiment of the system, main controller is provided by the execution of the respective processor executable code to perform the computer implementable step of transmitting the received signal to the potential target customers within the predetermined vicinity. In an embodiment of the system, the signal comprises a communication regarding the presence of the signal transmitting promoter being in the predetermined vicinity. In an embodiment of the system, the communication is indicative of additional information selected from the group consisting of a given amount of signal transmitting promoters within the predetermined vicinity, a predetermined ranking of the signal transmitting promoter or of each of the signal transmitting promoters in the given amount thereof; an amount of articles being promoted within the predetermined vicinity, a price range of articles being promoted within the predetermined vicinity, rewards associated with the purchase of articles being promoted within the predetermined vicinity and any combination thereof.

In an embodiment of the system, the merchant controller of step e) is in communication with an input/output merchant interface and wherein the promoter controller of step d) is in communication with an input/output promoter interface, wherein the main controller is provided by the execution of the respective processor executable code to perform the computer implementable step of superimposing the interface of the target customer controller that transmitted the captured marker to the main controller that resulted in the matching of step b) on the merchant interface and on the promoter interface for in tandem navigation thereof and for target customer inputs via the target customer interface. In an embodiment of the system, the promoter controller of step d) is provided by the execution of the respective processor executable code to perform the computer implementable step of storing article information in the memory thereof relative to the article promoted by the given promoter associated therewith, wherein the stored information comprises promoter reviews of the promoted article and sensor provided performance analysis of the promoted article.

In accordance with an aspect of the present disclosure, there is provided a method for providing a network between merchants of articles, target customers for articles and promoters of articles purchased from the merchants, the method comprising: providing a remote networked communication between a main controller with one or more merchants of articles, one or more promoters of articles and one or more target customers for articles; physically associating one or more markers with articles purchased from the merchants for being displayed by the promoters, the markers being configured for being remotely captured when the associated article is displayed; providing the target customers with selectively capturing any of the markers when a given article physically associated therewith is displayed in a marker capturing proximity with the target customer; providing the target customer transmitting the captured marker to the main controller; providing a respective databank for each of the merchants of articles sold thereby and of an association between a given purchased article purchased therefrom and a given promoter merchant associated therewith and a given promoter; communicating to the main controller which marker is transmitted thereto by which of the target customers; communicating to the main controller which of the markers are associated with which of the articles; communicating to the main controller which of the articles are sold by which of the merchants; communicating to the main controller which of the markers and which of the associated articles are associated with which of the promoters; communicating to the main controller which of the articles are sold by which of the merchants. The main controller providing for: matching the captured marker transmitted thereto to a given article purchased by a given promoter; matching a target customer to the captured marker transmitted thereto; matching the given article matched to the captured marker to a given promoter; providing the merchant to selectively transmit a communication via the main controller to the target customer that transmitted the captured marker to the main controller that resulted in the matching of step (i); providing the target customer to receive the transmitted communication from the merchant to input requests via the main controller based on the transmitted communication; providing the merchant to selectively transmit a communication to the promoter via the main controller based on the input request of the target customer.

In an embodiment of the method, the communication selectively transmitted to the target customer is selected from the group consisting of: data regarding the article physically associated with the captured marker, wherein the data is contained within the databank provided by the merchant controller; an offer to purchase an article contained in the databank of the articles sold by the merchant associated with the merchant controller selectively transmitting the communication, wherein the article contained in the databank is the same as, or similar to, or otherwise associated with the article physically associated with the captured marker; a discount on the offer to purchase an article contained in the databank of the articles sold by the merchant associated with the merchant controller selectively transmitting the communication; an offer for the target customer to input a given request; and any combination thereof.

In an embodiment of the method, the communication transmitted by the merchant to the promoter is selected from the group consisting of: communicating an allotment of points to the promoter; communicating an allotment of monetary funds to the promoter; communicating an allotment of virtual currency to the promoter; and any combination of the foregoing.

In an embodiment of the method, the input request of the target customer is selected from the group consisting of: a request for data regarding the article physically associated with the captured marker; a request to purchase an article sold by the merchant; a request to rate the article physically associated with the captured marker; and any combination of the foregoing.

In an embodiment of the method, the promoter is provided with remotely signaling to potential target customers within a predetermined vicinity. In an embodiment of the method, the step of remotely signaling comprises a communication regarding the presence of the signaling promoter being in the predetermined vicinity. In an embodiment of the method, the communication is indicative of additional information selected from the group consisting of the type of article being promoted by the signaling promoter, a given amount of articles being promoted by the signaling promoter, a price range of articles being promoted by the signaling promoter, rewards associated with the purchase of articles being promoted by the signaling promoter and any combination thereof. In an embodiment of the method, communication is modulated so as to indicate information selected from the group consisting of a given amount of signaling promoters within the predetermined vicinity, a predetermined ranking of the signaling promoter or of each of the signaling promoters in the given amount thereof; an amount of articles being promoted within the predetermined vicinity, a price range of articles being promoted within the predetermined vicinity, rewards associated with the purchase of articles being promoted within the predetermined vicinity and any combination thereof.

In an embodiment, the method further comprises the step of providing for the promoter to remotely provide the target customer with selectively accessible information relative to the article promoted by the promoter associated therewith, wherein the selectively accessible information comprises promoter reviews of the promoted article and sensor provided performance analysis of the promoted article.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an aspect of the present disclosure there is provided a system for providing a network between merchants of articles, target customers for articles and promoters of articles purchased from the merchants. The system comprises a main controller in communication with one or more target customer controllers, one or more merchant controllers and one or more promoter controllers, Each of the main controller, the target customer controllers, the merchant controllers and the promoter controllers are configured for such communication and respectively comprise a respective processor with a respective associated memory having a respective processor executable code stored thereon. Each of the target customer controllers are associated with a respective one of the target customers. Each of the merchant controllers are associated with a respective one of the merchants of articles. Each of the promoter controllers are associated with a respective one of the promoters of articles.

One or more markers are physically associated with articles purchased from the merchants for being displayed by the promoters. The markers are configured for being remotely captured by a capturing device when the associated article is displayed.

Each of the target customer controllers is in communication with a respective input/output interface and a respective marker capturing device for providing the target customer with selectively capturing any of the markers when a given article physically associated therewith is displayed in a marker capturing proximity with the marker capturing device. Each of the target customer controllers is provided by the execution of the respective processor executable code to perform computer implementable steps of: receiving the captured marker from the marker capturing device; and transmitting the captured marker to the main controller.

Each of the merchant controllers is provided by the execution of the respective processor executable code to perform computer implementable steps of: providing a databank (of articles sold by the merchant associated therewith); and an association between a given purchased article sold by the merchant associated therewith and a given promoter; and communicating to the main controller: the articles sold by the merchant associated therewith; and the association between the given purchased article sold by the merchant associated therewith and a given promoter.

The main controller is provided by the execution of the respective processor executable code to perform computer implementable steps of:

(a) Providing a databank of: (i) stored system members including the merchants of the articles with physically associated markers, the target customers for the articles with physically associated markers and the promoters of the articles with physically associated markers purchased from the merchants; (ii) stored associations between the markers and the articles physical associated therewith; (iii) stored associations between the given purchased article and the given promoter as communicated thereto by the merchant controllers, (iv) stored associations between the articles sold by the merchant and the merchant controllers associated therewith; (v) stored associations between a given one of the captured markers and the target customer associated with the target customer controller transmitting the given one of the captured markers;

(b) matching the captured marker transmitted thereto to a given article purchased by a given promoter based on the stored associations of step a)(ii);

(c) matching a target customer to the target customer controller associated therewith that transmitted the captured marker based on the stored associations of step a)(v);

(d) matching the given article matched to the captured marker in step b) to a given promoter controller associated with a given promoter based on the stored associations of step a)(iii);

(e) communicating the given article matched to the captured marker in step b) to the merchant controller associated therewith based on the stored associations of step a)(iv).

The merchant controller of step e) is provided by the execution of the respective processor executable code to perform a computer implementable step of selectively transmitting a communication to the target customer controller that transmitted the captured marker to the main controller that resulted in the matching of step b).

The target customer controller receiving the transmitted communication from the merchant controller of step e) is provided by the execution of the respective processor executable code to perform the computer implementable step of providing the target customer associated therewith to input requests via the input/output interface to the merchant controller of step e) based on the transmitted communication.

The merchant controller of step e) is provided by the execution of the respective processor executable code to perform the computer implementable step of selectively transmitting a communication to the promoter controller of step d) based on the input request of the target customer that transmitted the captured marker to the main controller that resulted in the matching of step b).

Generally stated an in accordance with an aspect of the present disclosure, there is provided a method for providing network between merchants of articles, target customers for articles and promoters of articles purchased from the merchants.

Generally stated and in accordance with an aspect of the present disclosure, there is provided a system allowing users to act as customers, promoters or merchants of articles. The articles are smart articles that are worn or otherwise publicly exposed or displayed by promoters who have purchased these articles from the merchants. The customer uses a mobile controller device to access data from the article by capturing an identifying marker on the article and transmitting the foregoing data to a main controller which places the customer in communication with the merchant from whom the promoter purchased the article. The merchant can thus provide data regarding the article to the customer via the main controller and depending on how the customer acts, the merchant can allocate a reward to the promoter. In an embodiment, the merchant provides purchasing information to the customer and if the customer purchases a like article, the merchant provides a commission or a credit to the promoter. In an embodiment, the systems and methods provided herein provide users (i.e. customers) to purchase articles they see in public by capturing identifying markers integrated in the articles when they are in proximity therewith (i.e. near-filed communication). In an embodiment, the systems and methods provided herein provide users (i.e. promoters) to be rewarded by merchants for publicly exposing articles purchased therefrom.

Figure 1:
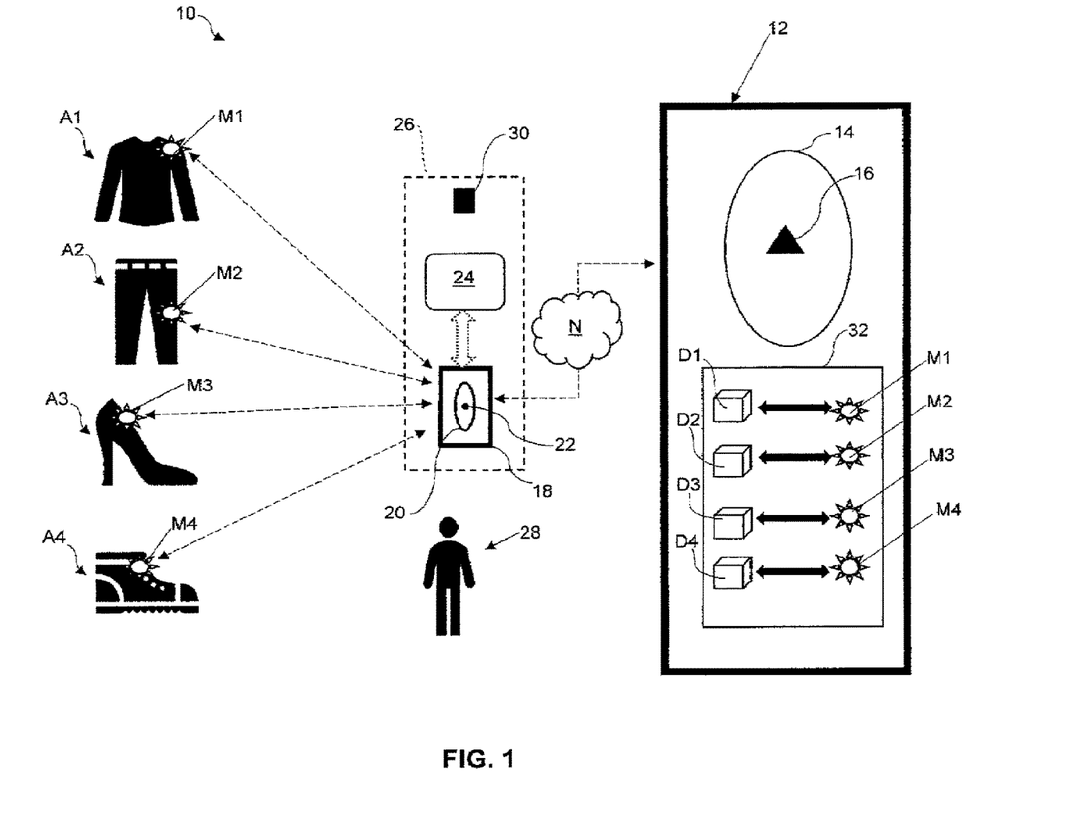
FIG. 1 is schematic illustration of the system for providing access to data from merchants to customers via articles publicly displayed by promoters in accordance with a non-limiting illustrative embodiment of the present disclosure.

FIG. 1 shows a system 10 comprising a main system controller 12 having a processor 14 with an associated memory 16 of processor executable code. The main system controller 12 is in operative communication via a network 'N' with a target customer controller 18. The target customer controller 18 includes a processor 20 with an associated memory 22 of processor executable code. The target customer controller 18 is in operative communication with a target customer interface 24.

The controller 18 and the interface 24 can be provided in a handheld mobile device 26.

In an embodiment, the interfaces herein are modules including a variety of components as required for allowing users herein to receive data and transmit data and for visually ascertaining data and for transmitting data via commands as is well understood by the skilled artisan. In an embodiment, the interfaces herein include without limitation an input/output interfaces providing for transferring information between internal storage and external 110 devices, a display for visual output including without limitation a digital screen for viewing visual data, an input command device including without limitation a keypad, a touchscreen, a microphone for voice commands as well as input/output communications devices for interfacing with other input/output communications devices directly or via a network including transmitting and receiving data to and from such other input/output communications devices.

A target customer 28 may use their handheld device 26 to identify an article such as A1, A2, A3, A4. In an embodiment, article A1 is a clothing article such as a shirt, a sweater and the like; article A2 is pants; article A3 are high heel shoes and article A4 is sports footwear. Of course, the articles can be of any kind that the target customer 28 may desire including furniture, vehicles, jewelry, sports equipment to provide just a few non-limiting examples.

Each article A1, A2, A3 and A4 is embedded with a respective identification (ID) marker, M1, M2, M3 and M4. The ID marker is selected from the group consisting of smart textiles, e-textiles, smart garments, smart chips, micro-chips, smart tags, near-field communications tags, barcodes, Quick Response codes, small transmitters, RFID emitters, sound emitters, visual cues including logos, symbols and/or serial numbers, wearable technologies, wearable computers, sensors, smart electro-clothing systems, screen-printed antennas and sensor on a substrates, and the like including combinations thereof.

A marker as understood herein may be a single component or a module of various components for completing the marker function provided herein (i.e. to provide a marking for capture thereof). In an embodiment, the marker comprises a device providing a marking (visual, sound, electronic/digital) such as for example, a visual emitter providing a visual marker, an electronic/digital emitter providing a signal marker, a sound emitter providing a sound marker. Therefore, in an embodiment, the marker is both the device and the aforementioned marking. In an embodiment, capturing a marker such as recording a marker comprises a visual capture or recording of a marker including and without limitation to a logo, a serial number, a code, a barcode, a OR code, a smart label, an article configuration and the like and combinations thereof. In an embodiment, capturing a marker such as recording a marker comprises an electronic or digital capture or recording of a marker such as a signal including, and without limitation thereto, a communication signal, a pulse, an RFID signal, a digital signal and the like and combinations thereof. In an embodiment, capturing a marker such as recording a marker comprises a sound capture or recording of a sound including an audible sound or an inaudible sound (infrasound, ultrasound). For further clarity and in accordance with a non-limiting example, a marker includes the material of the article in which a device sending a signal is embedded in, the device itself (for example a transmitter) as well as the signal being sent. In another example, the marker includes a hybrid marking such as both a OR code and an inaudible soundwave. Accordingly, in this example, the marker includes the code, the soundwave, and the speaker as well as the material and support matrix in which the speaker is embedded into so that it is physically associated with the article being displayed. The marking in the foregoing example is the combination of the natural light emanating from the QR code (for visual capture thereof) and the sound emanating from the speaker which all together form the marker including the material for physical attachment of the marker to the article (whether embedded or otherwise physically connected). Thus, the marker is a module that provides a marking function allowing the capturing devices 30 to capture the markers as understood herein. Thus, capturing includes capturing or recording an image, capturing or recording a signal (light, sound, digital etc.). It is further understood that a marker capturing proximity is the distance required for the marker capturing device 30 to capture the marker as provided herein. In an embodiment, the capturing device 30 is a module of several types of marker capturing devices including a camera, a microphone, a receiver, an input/output module and the like as will be understood by the skilled artisan.

In public, when the target customer 28 sees an article they desire, they can attempt to identify the article via their handheld mobile device 26. The device 26 includes the aforementioned marker capturing device such as an ID marker recorder 30 including a camera, a sound capturing device such as a microphone, a telecommunications device, a receiver, an RFID device, a scanner and the like as well as combinations thereof. In an embodiment, the user takes a photo of the article (e.g. A1, A2, A3, A4). In an embodiment, the target customer 28 causes by way of commands via the interface 24 for the processor to execute the processor executable code allowing the controller 18 to perform the step of capturing (or recording) the ID marker.

In an embodiment, capturing the image of an article A1, A2, A3, A4 provides for recording the associated ID marker M1, M2, M3, M4. In an embodiment, recording the ID marker comprises capturing an image of the article in combination with receiving a signal emitted by the ID marker embedded within the article. The foregoing signal comprises data emitted by a smart chip for example. Once the ID marker (M1, M2, M3, M4) of the desired article (A1, A2, A3, A4) is recorded by the target customer 28, controller 18 performs the step of transmitting the recorded ID marker to the main system controller 12.

The main system controller 12 includes a database 32 in which a plurality of ID markers M1, M2, M3, M4, are associated with respective article data D1, D2, D3, 04. For example, M1 comprises a QR code and a digital signal combination that corresponds to D1. In another example, M1 comprises an RFID signal and a label color that corresponds to D1. In a further example. M2 comprises an inaudible signal in combination with a logo associated with D2. In other examples, M1 comprises the image of the article which corresponds to D1.

Figure 2:
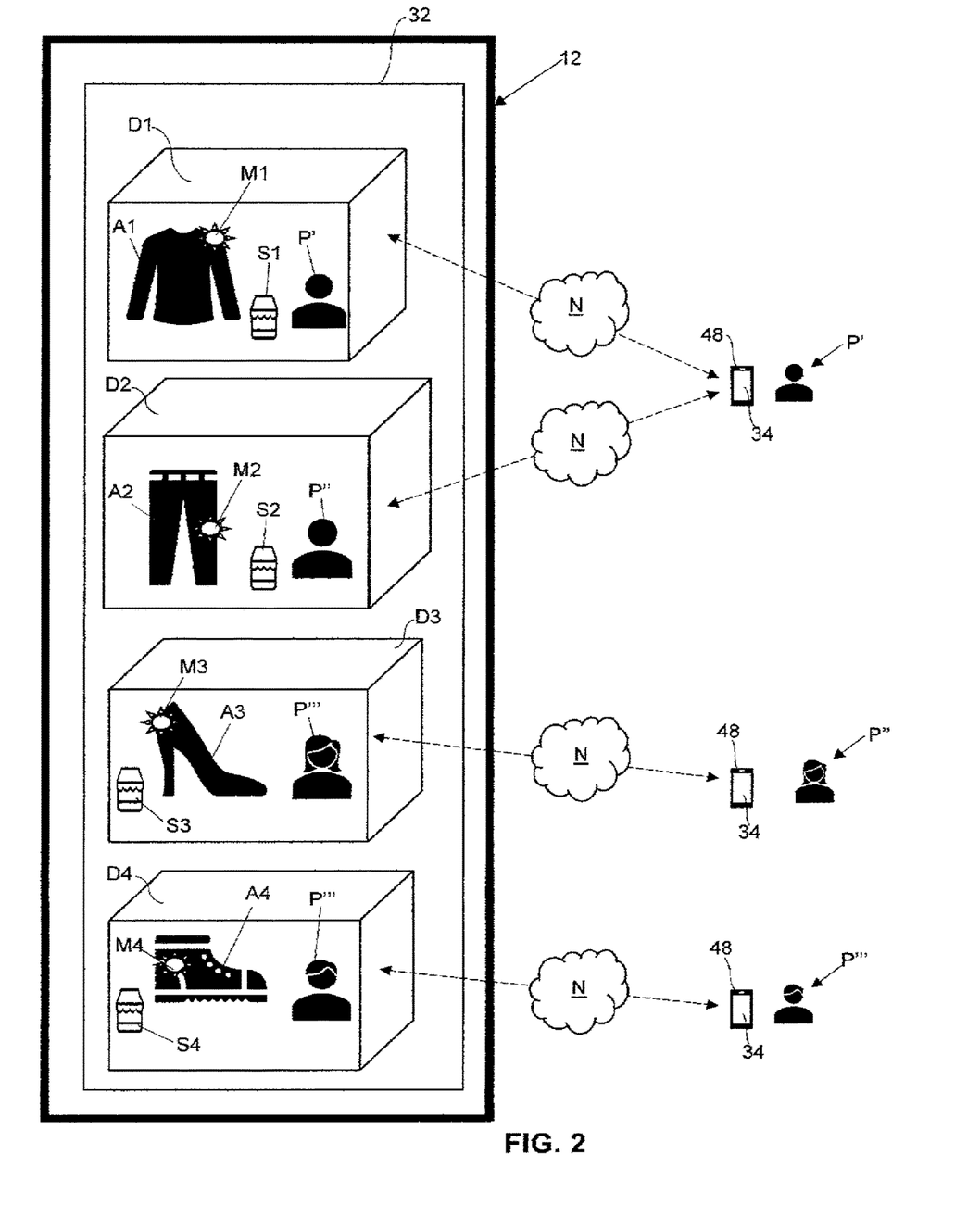
FIG. 2 is schematic illustration of a portion of the system for providing access to data from merchants to customers via articles publicly displayed by promoters in accordance with a non-limiting illustrative embodiment of the present disclosure.

Turning to FIG. 2, the article data D1, D2, D3, D4 for each marker M1, M2, M3, M4 associates the marker to the given article A1, A2, A3, A4 and to a given promoter, P', P", P''' and to a given merchant S1, S2, S3, S4. The system controller 12 is in operative communication via network N with a promoter controller 34 accessed by each respective promoter P', P", P'''.

Figure 3:
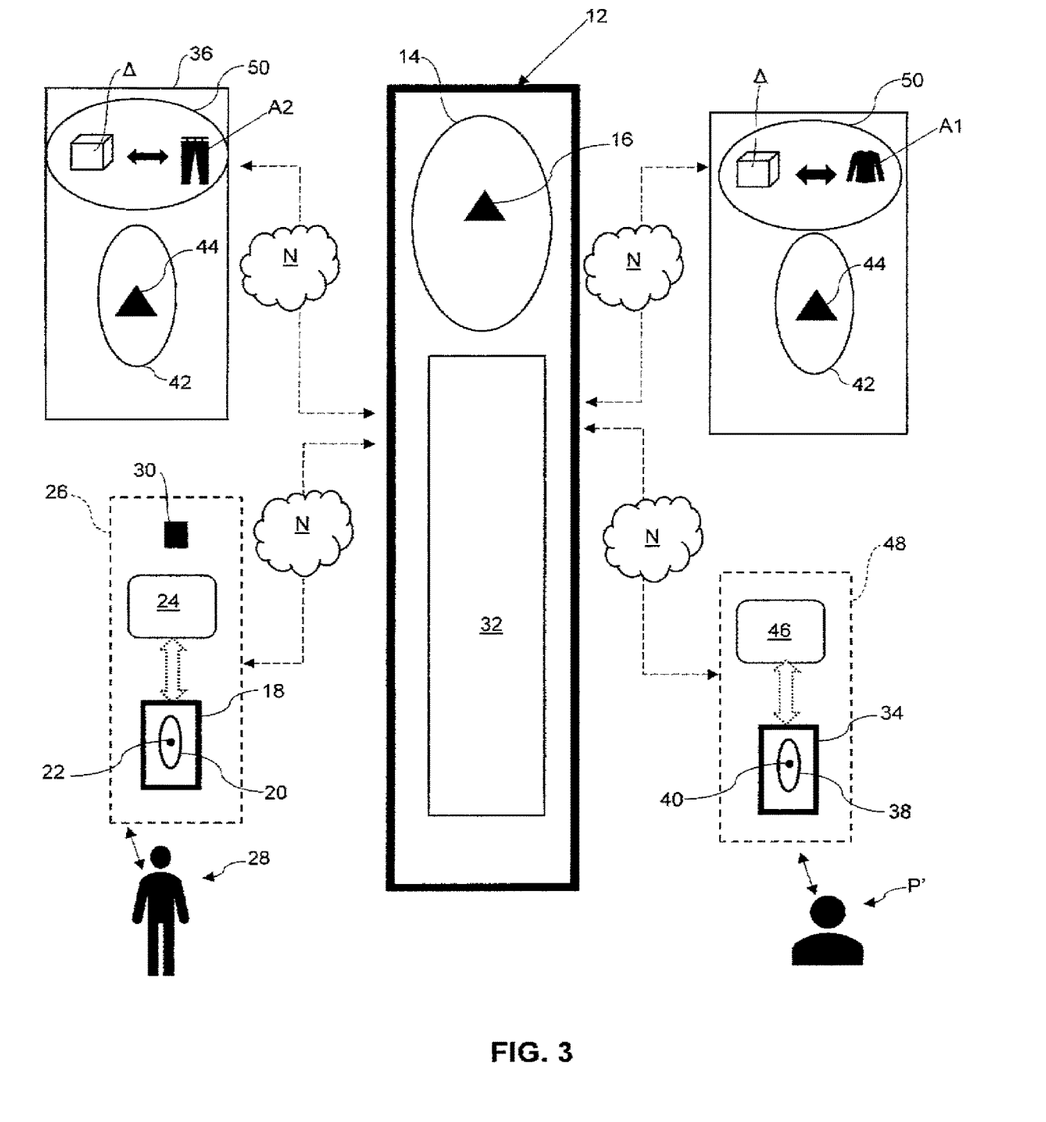
FIG. 3 is a schematic illustration of another portion of the system for providing access to data from merchants to customers via articles publicly displayed by promoters in accordance with a non-limiting illustrative embodiment of the present disclosure.

Turning to FIG. 3, system controller 12 is in operative communication with merchant controllers 36 belonging to respective merchants S1, S2, S3, and S4. Moreover, FIG. 3 also shows that each promoter controller 34 includes a processor 38 with an associated memory 40 of processor executable code. Similarly, each merchant controller 36 includes a processor 42 with an associated memory 44 of processor executable code. Moreover, the promoter controller 34 is in operative communication with a promoter interface 46 which can be integrated along with the controller 34 within a handheld unit 48.

Thus, and with respect to FIGS. 1, 2 and 3, the system 10 comprises a main system controller 12 in operative communication via a network N with one or more target customer controllers 18, one or more promoter controllers 34 and one or more merchant controllers 36. Accordingly, the system 10 provides a multifaceted and trilateral relationship between merchants S1, S2, S3, and S4, promoters P', P'', P''' and target customers 28.

Each article A1, A2, A3 and A4 has been previously purchased by a promoter P', P'', P'''. This purchase information is stored within the databank 50 of the merchant controller 36. This purchase may be a direct purchase between a promoter P', P'', P''' and the merchant, which communicates the purchase information to the controller 36 which in turn communicates the foregoing purchase information or association between the purchased article and purchasing promoter to the system controller 12. In another embodiment, the purchase information is communicated to the system controller 12 via the promoter controller 34. In another embodiment, the purchase is executed via the system controller 12. Thus, the merchant databank 50 has associated the purchased article (A1 or A2 for example) to respective article information A within the databank 50. This article information A includes information related to the type, category and features and other relevant information related to the article that was purchased, the purchase information (previously discussed), the purchaser information (i.e. the promoter information) such as the name, contact information or other identification information in order to communicate with the promoter (P', P'', P''') related to the article (A1, A2, A3, A4) in question.

With reference to FIGS. 1 to 4 the article data D1, D2, D3, D4 associates each ID marker M1, M2, M3, M4 to a respective article A1, A2, A3, A4, and further associates each article to a given promoter P', P'', P'''. The databank 50 of the purchaser controller 36 associates the article A1, A2, A3, A4 to article information Δ including the identification of the promoter (P', P'', P''') and information on the article, information on inventory (I) related to the article, one or more rewards (R) offered to the promoter based on an activity by the target customer 28 and one or more promotional communications and rewards (W) offered to the target customer 28 based on an activity of the target customer 28.

Figure 4:
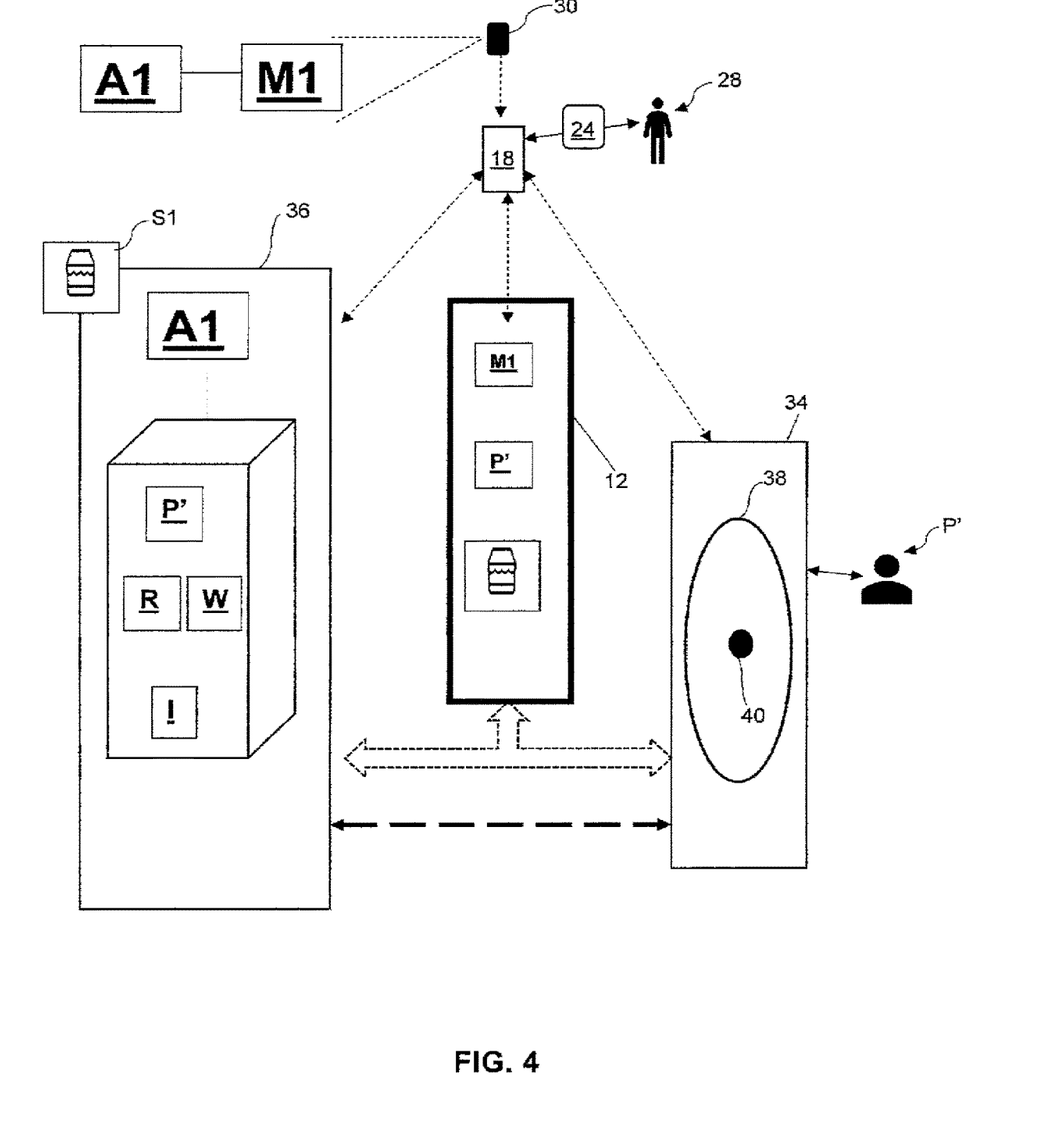
FIG. 4 is another schematic illustration of the system for providing access to data from merchants to customers via articles publicly displayed by promoters in accordance with a non-limiting illustrative embodiment of the present disclosure.

With particular reference to FIG. 4 all the while generally referring to FIGS. 1-3, the target customer 28 attempts to identify information related to a desired article A1 they see in public by capturing the ID marker M1 of this article A1, this captured marker M1 is communicated to the main controller 12 via the target customer controller 18. Since the main controller 12 contains in its databank 32 an association between the ID marker M1 and the article data D1, the main controller 12 executes the processor executable steps of identifying the article A1, identifying the promoter P' who is promoting the article A1 by publicly using it and identifying the merchant S1 who sold the article A1 to the promoter P'. The main controller 12 then executes the step of notifying the merchant S1 merchant controller 36 that the article A1 has been identified by a target user 28. In an embodiment, the promoter P' may be notified of the foregoing by the main controller 12 or the merchant controller 36.

The merchant controller 36 contains a databank 50 associating the article A1 to article information Δ which contains inventory information (I) related to the article A1, such as like articles, exact articles, similar articles, or any other article associated with article A1 by the merchant S1. The article information Δ further includes the ID of the promoter P' who purchased the article for example, their username, email or contact information. The foregoing can be contained only by the main controller 12 and thus all communication to the promoter P' is only via the main controller 12. The article information Δ also includes promotional, advertising or incentives to purchase information (W) which is communicated to the target customer 28 via their interface 24 by way of the main controller 12. For example, the target customer 28 may be shown a variety of similar shirts to A1 or other related articles like a watch, a cap of the same line or brand and be provided with a discount, points, remuneration in real or virtual currency if they purchase it or incite someone else to purchase from the merchant S1.

Once an event is completed, (e.g. purchase of article, purchasing a points card, inciting someone else to purchase, signaling that they like or otherwise admire a given article or articles or brands on social media, signing up to a group an email list, reviewing merchant provided information, going to one of the stores of the merchant and identifying themselves via a customer code etc.), the merchant controller 36 performs the processor executable step of allocating a reward R to the promoter P' depending on the type of event completed by the target customer 28. For example, if the target customer purchases the same type of article as A1 (e.g. a shirt), the reward may comprise cash, points, virtual currency, a discount and the like or a combination of the foregoing.

A member of the system 10 (i.e. the target customer 28) can use their mobile device to capture the ID marker of an article (A1, A2, A3, A4) they like which triggers a communication with the merchant (S1, S2, S3, S4) of the article offering via their mobile device to buy the same type of article. Once the user purchases the article, the other member of the system 10 (the promoter, P', P'', P''') will be notified of the purchase and receive a reward such as and without limitation to a commission, a credit, a gift, real or virtual remuneration and the like. In another scenario, if the target customer 28 does not purchase the article, the promoter P', P'', P''' may receive points which when accumulated can be used as credit. The target customer 28 who purchased the article may now act as a promoter for the same article and incite other target customers for a similar purchase, in this case the second tier purchase by a second target customer provides a reward such as and without limitation to a commission, a credit, a gift, real or virtual remuneration and the like, to the direct promoter (who acted as a target customer initially) as well as to the originating promoter. The foregoing allows the users to build a 'book of business' recognized by the system.

Moreover, promoters with many points can be advertised on social media, provided with promotional trips or paid to show up to events, creating promoter jobs from target customers.

The system 10 provides merchants to track articles after the point of sale as well as monitor non-sale reactions (likes. reviews etc.) from potential and target customers. The system 10 thus allows the merchants to be in communication with all past customers (who act as promoters following a purchase). In this way, products may be sold before manufacturing, orders may be collected on a monthly basis and delivered periodically following manufacturing. The target customer may be provided information regarding the date or initialization of manufacture and may even make special requests on the item in addition to color and size (e.g. no pockets, or more pockets, place the logo elsewhere etc.) prior production and following additional payment. Having much tighter control on advertising costs and effectiveness being able to target specific loyal customers with greater incentives.

In another non-limiting scenario event organizers may knowingly or unknowingly invite promoters to an event the system 10 provides for the organizers (via their membership) to receive a reward such as and without limitation to a commission, a credit, a gift, real or virtual remuneration and the like in view of target customer activity based on capturing ID markers on articles associated with promoters and completing events that are selectively satisfactory to merchants in order for the merchants to provide the event organizers a given reward as described.

With reference to FIG. 4, a promoter controller 34 is in selective communication with the target customer controller 18. This communication may be direct communication or via the main system controller 12. The selective communication can be activated or disactivated by the promoter P' and/or target customer 28. Indeed, the controllers 18 and/or 34 execute the computer implementable step of activating or disactivating this selective communication via input commands from the input/output interfaces 24 and/or 46. In this way, one or more promoters sends a signal via their controller 34 to a potential target customer controller 18 that may be within a predetermined vicinity to capture this signal via direct controller 18 to controller 34 communication or via the main system controller 12. In an embodiment, this signal indicates a proximity level thereto (for example within 2 Km, 1 Km, 500 m etc.).

This signal acts as a "wake up call" for the target customer 28 to be "on alert" that there is one or more promoters promoting marked articles (as provided herein) in their near-field communication vicinity. The target customer 28 can thus be on the "look out" of for any items (A1, A2, etc.) that they may find desirable to capture/record the markers thereof (M1, M2, etc.) via capturing device/recorder 30 as provided herein.

The signal communicated to the target customer 28 via their interface is provided in the form of a communication, a message, an indication, an audible cue, a visual cue, a pulse, a vibration imparted to their mobile device 26 and the like.

The signal that is communicated to the target customer 28 via their interface 24 is modulated based on various predetermined factors which may be stored within the memory 22 of the target customer controller 18 or the memory 16 of the main system controller 12. In an embodiment, this signal is modulated by the number of promoter controllers 34 within the predetermined vicinity of the target customer controller 18 in question. For example, the target customer interface 24 will indicate a low, medium or high level of promoter presence or use color codes therefor or symbols or indicia or sounds or vibrations and the like as can be contemplated within the scope of the present disclosure. In an embodiment, this signal is modulated based on the number of marked articles promoted by the promoter P'. For example, the promoter P' can register daily or on another basis which articles they are currently promoting (i.e. wherein currently refers to the time concurrent with the discussed signal emanating from the promoter controller 34 to potential target customer controllers 18 within the aforementioned vicinity). This signal is captured by the target customer controller 18 and is communicated to the target customer 28 via the interface 24 of this target customer 28. For example, the promoter controller 34 or the main controller 12 executes the computer implemented step of sending a signal with a message related to the number of registered articles (i.e. articles having markers that are being currently promoted by the promoter). The message may be a code including color, a symbol, indicia, and the like. In an embodiment, the target customer controller 18 or the main controller 12 executes the computer implementable step of signaling to the target customer 28 via the interface 24 that a given number of promoters or a threshold number of promoters or a category code related to a range number of promoters is present in their vicinity. In an embodiment, the target customer controller 18 or the main controller executes the computer implementable step of signaling to a target customer 28 a given number of marked articles or a threshold number of marked articles or a category code related to a range number of marked articles present in their vicinity. In an embodiment, the main controller 12 or the target customer controller 18 executes the computer implementable step of providing a score based on a given number of promoters and marked articles or a threshold number of promoters and marked articles or a category code related to a range number of promoters and marked articles and of communicating this score to the target customer 28 via the interface 24.

The signal may also be modulated by the ranking of a given promoter. The system controller 12 provides for executing the computer implementable step of ranking promoters based on their success at prompting sales or events as provided herein and as such, the signal sent to the target customer controller 18 will be modulated by the system controller 12 to provide a message/communication indicative of a ranking of the promoter or promoters in the communication vicinity. Thus, a target customer 28 receives this message via their interface 24 as mentioned before and is advised of the popularity of the articles promoted by a promoter in their vicinity.

Indeed, the system 12 if requested by the promoter and the target customer 28 provides the identity of the promoter and their position based on criteria selected by the target customer 28, for example a given vicinity of a promoter, the types of articles promoted by the promoter, the popularity of the articles promoted by the promoter, and/or success of a given promoter and combinations thereof. The foregoing information or signal search criteria is selected by the target customer 28 via their interface 24 by way of input commands sent to the system controller 12 which stores this criteria in its memory 16 and executes the computer implementable step of receiving information that: a signal is being transmitted from the promoter controller 34 to potential target customer controllers 18 and/or the computer implementable step of receiving information that a signal transmitted from a promoter controller 34 has been received by a target customer controller 18 and/or receiving information from promoter controllers 34 and from target customer controllers 18 regarding their respective positions and informing target customers 18 that promoters are in their vicinity so as to provide the so-called "wake up call". The controller 12 provides for modulating the signal so that the information communicated to the target customer 28 via their interface indicates required information including the types of articles, the popularity of articles, the success of promoters, the number or comparative amount (e.g. low, medium, high) of promoters within the vicinity and the number or comparative amount (e.g. low, medium, high) of marked articles within their vicinity.

Thus a target customer 28 may receive information regarding the number of promoters and/or promoted articles within their communication vicinity or the promoter and/or article characteristics within their communication vicinity (depending on the characteristics they are looking for) thus prompting them to be alert for recording potential marked articles of interest by the system and process provided herein or even providing them with real time identification and position information of the promoter so that they can have direct contact with them.

Figure 5:
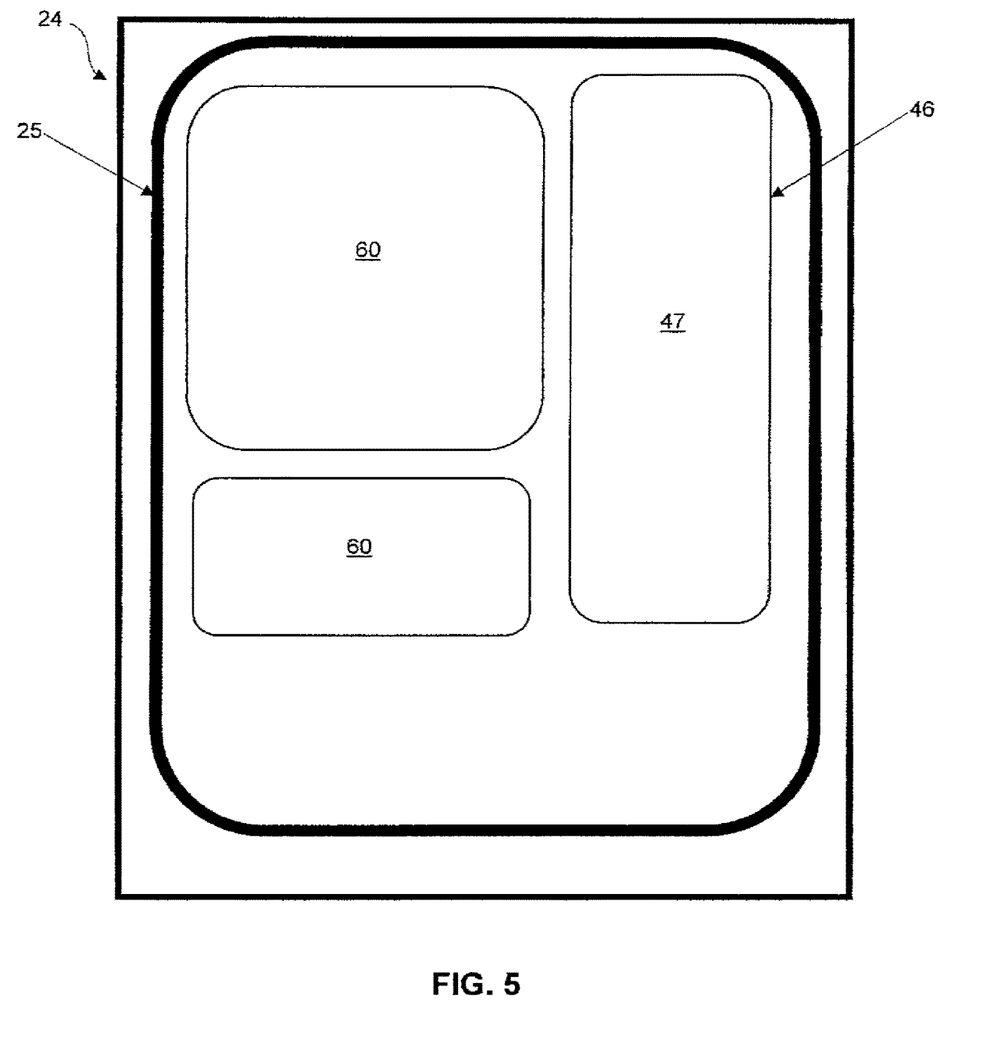
FIG. 5 is a schematic illustration of the input/output interface of a target customer of the system simultaneously superimposed on accessible merchant and promoter interfaces of the system in accordance with a non-limiting illustrative embodiment of the present disclosure.

Turning to FIG. 5, there is shown a target customer interface 24 being simultaneously superimposed on both a merchant interface 60 and a promoter interface 46. In this example, the interface 24 includes a visual image 25 via a display 64 (such as a screen). Thus, when a target customer 28 captures/records a marker (e.g. M1) of an article (e.g. A1) as provided herein and a match between a marked article (e.g. A1-M1) is made with a merchant controller 36 (of the merchant that sold the article as provided herein) and of a promoter controller 34 (of the promoter that is promoting this given article), the main controller 12 executes the computer implementable step of providing the target customer interface 28 to be superimposed on the merchant interface 60 (i.e. website) which provides information on the article in question and on the promoter interface 46 which includes a visual image 47 (i.e. promoter system profile page) being displayed via display 64 and which provides information on other articles promoted (i.e. liked or bought or displayed on other occasions) by the promoter as well as links to further merchant interfaces related to those articles in their list. Thus, multiple merchant interfaces can be superimposed by the target customer interface 24. Indeed, the target customer 28 can thus purchase an article or comment on articles appearing on one or more websites in tandem as well as review articles belonging to the same promoter. For example, shoes belonging to a given promoter may incite the target customer to see what other clothing articles this promoter is promoting and as such click on those products to prompt the merchant interfaces belonging to the merchants selling these products to be accessed.

In another embodiment, the promoter may provide marketing information on the marked article in order to further prompt the target customer 28 from taking action. In yet another embodiment, the marked articles may include further sensors that log information related to the use of the marked article. For example, a marker M4 on shoes may log the amount of usage of an shoe such as article A4 and this information is logged into the system database 32 and communicated to the target customer user via superimposed interfaces provided in FIG. 5. Sensors can include pressure sensors, biosensors, and the like. Thus the target customer 28 can simultaneously navigate one or more merchant interfaces 60 and one or more promoter interfaces 46 by having their interface 24 and more particularly the visual image 25 of their interlace tandemly superimposed on the merchant websites 60 and the promoter system profile pages 47. Thus, the user can simultaneously navigate the one or more merchant websites and the one or more profile pages 47 or portions thereof.

The present system and method provide for a target customer user to access data regarding articles that are being used by people in their visual surroundings. Thus, a potential customer no longer needs to remember a pair of sneakers, a purse, a jacket or a bicycle they saw on the street, the bus, the park or the supermarket and try to find it online later on in the day. A potential customer can simply use their mobile handheld unit in a marker capturing proximity of the article to capture a marker if one is available and thus access data related to the article via the merchant controller as explained above to take an action such as purchasing the article. The user can also access information provided by the promoter related to the article as explained above and thus have hands on review from the person they saw using it or even a performance analysis from the sensors logging article use information as provided herein. Thus, a potential customer has real-time and accurate access to data related to an article they encountered in public display as well as a review, performance data and of course purchasing information directly from the merchant.

In an embodiment, the system and method herein provide for an ambient environment shopping area where system users can provide input on the articles they are wearing, riding on, carrying or otherwise associated with in public display. These comments, opinions and even sensor-based performance reports as well as the purchase information for real-time purchasing are accessible to other people within the marker capturing proximity in real time. People who like the same activity tend to congregate in common physical areas, gyms, parks, museums and as many of these same people have common apparel (running shoes, coats, watches), therefore there is a greater chance that target customers will find articles of interest in areas they tend to congregate to with like-minded people. Moreover, many of these areas are external and there is no need for packed malls or stores, thus allowing for greater social distancing if required as in pandemic or epidemic circumstances. In addition, people can seamlessly mix their social time with their shopping time.

Of course, the present system and method can still work within traditional shopping outlets. In an embodiment, the merchant controller communicates the availability of the article in stores nearby and provides a reservation for the article for a given period. Thus, the merchant controller communicates with the store controllers for this reservation and allocates a reservation number to the target customer to show the store personnel in order to try out the article and purchase it. In another implementation, the customer user simply orders the article online.

Moreover, the customer user can via a suitable screen such as a tablet or a smart phone having a foldable screen that is enlarged when unfolded, simultaneously via their interface navigate the merchant website (related to the article they captured the marker from) and the promoter system profile (of the promoter publicly promoting the article by using it as it was intended to be used). This "in tandem" navigation further provides an easy visual assessment of the product from the point of view of a promoter and the purchase information provided by the merchant. Indeed, the system and method provide for a customer user to immediately access information in real time regarding an article they are interested in that is simply displayed in public and have simultaneous visual access to the merchant website for shopping as well as to the promoter's information related to this article in order to take an action including purchasing, commenting and the like as provided herein. The system provides financial incentives to merchants, promoters and customers to thus populate the databanks of the system which results in more marked articles promoted in public by more promoters allowing customers greater access to desired and accurate information, reviews, performance data and the like as well as immediate purchase if desired.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A system for providing a network between merchants of articles, target customers for articles and promoters of articles purchased from the merchants, the system comprising:

a main controller in communication with one or more target customer controllers, one or more merchant controllers and one or more promoter controllers, wherein each of the main controller, the target customer controllers, the merchant controllers and the promoter controllers are configured for such communication and respectively comprise a respective processor with a respective associated memory having a respective processor executable code stored thereon, wherein each of the target customer controllers is associated with a respective one of the target customers, each of the merchant controllers is associated with a respective one of the merchants of articles, and each of the promoter controllers is associated with a respective one of the promoters of articles, one or more markers being physically associated with articles purchased from the merchants for being displayed by the promoters, the markers being configured for being remotely captured by a capturing device when the associated article is displayed;

each of the target customer controllers being in communication with a respective input/output interface and a respective marker capturing device for providing the target customer with selectively capturing any of the markers when a given article physically associated therewith is displayed in a marker capturing proximity with the marker capturing device, each of the target customer controllers being provided by the execution of the respective processor executable code to perform computer implementable steps of:

receiving a captured marker from the marker capturing device; and transmitting the captured marker to the main controller;

each of the merchant controllers being provided by the execution of the respective processor executable code to perform computer implementable steps of:

providing a databank of:

articles sold by the merchant associated therewith; and an association between a given purchased article sold by the merchant associated therewith and a given promoter; and communicating to the main controller:

the articles sold by the merchant associated therewith; and the association between the given purchased article sold by the merchant associated therewith and a given promoter;

the main controller being provided by the execution of the respective processor executable code to perform computer implementable steps of:

a) providing a databank of:

(i) stored system members including the merchants of the articles with physically associated markers, the target customers for the articles with physically associated markers and the promoters of the articles with physically associated markers purchased from the merchants;

(ii) stored associations between the markers and the articles physically associated therewith;

(iii) stored associations between the given purchased article and the given promoter as communicated thereto by the merchant controllers, (iv) stored associations between the articles sold by the merchant and the merchant controllers associated therewith;

(v) stored associations between a given one of the captured markers and the target customer associated with the target customer controller transmitting the given one of the captured markers;

b) matching the captured marker transmitted thereto to a given article purchased by a given promoter based on the stored associations of step a)(ii);

c) matching a target customer to the target customer controller associated therewith that transmitted the captured marker based on the stored associations of step a)(v);

d) matching the given article matched to the captured marker in step b) to a given promoter controller associated with a given promoter based on the stored associations of step a)(iii);

e) communicating the given article matched to the captured marker in step b) to the merchant controller associated therewith based on the stored associations of step a)(iv);

wherein the merchant controller of step e) is provided by the execution of the respective processor executable code to perform a computer implementable step of selectively transmitting a communication to the target customer controller that transmitted the captured marker to the main controller that resulted in the matching of step b);

wherein the target customer controller receiving the transmitted communication from the merchant controller of step e) is provided by the execution of the respective processor executable code to perform the computer implementable step of providing for the target customer associated therewith to input requests via the input/output interface to the merchant controller of step e) based on the transmitted communication;

wherein the merchant controller of step e) is provided by the execution of the respective processor executable code to perform the computer implementable step of selectively transmitting a communication to the promoter controller of step d) based on the input request of the target customer that transmitted the captured marker to the main controller that resulted in the matching of step b).

2. A system according to claim 1, wherein the communication selectively transmitted to the target customer controller that transmitted the captured marker to the main controller that resulted in the matching of step b) is selected from the group consisting of:

data regarding the article physically associated with the captured marker, wherein the data is contained within the databank provided by the merchant controller;

an offer to purchase an article contained in the databank of the articles sold by the merchant associated with the merchant controller selectively transmitting the communication, wherein the article contained in the databank is the same as, or similar to, or otherwise associated with the article physically associated with the captured marker;

a discount on the offer to purchase an article contained in the databank of the articles sold by the merchant associated with the merchant controller selectively transmitting the communication;

an offer for the target customer to input a given request; and any combination thereof.

3. A system according to claim 1, wherein the communication transmitted by the merchant controller of step e) to the promoter controller of step d) based on the input request of the target customer that transmitted the captured marker to the main controller that resulted in the matching of step b) is selected from the group consisting of:

communicating an allotment of points to the promoter;
   communicating an allotment of monetary funds to the promoter;
   communicating an allotment of virtual currency to the promoter; and
   any combination of the foregoing.

4. A system according to claim 1, wherein the input request of the target customer that transmitted the captured marker to the main controller that resulted in the matching of step b) is selected from the group consisting of:

a request for data regarding the article physically associated with the captured marker, wherein the data is contained within the databank provided by the merchant controller;

a request to purchase an article sold by the merchant associated with the merchant controller of step e);

a request to rate the article physically associated with the captured marker; and any combination of the foregoing.

5. A system according to claim 1, wherein the promoter controller is provided by the execution of the respective processor executable code to perform the computer implementable step of transmitting a signal to potential ones of the target customer controllers within a predetermined vicinity.

6. A system according to claim 5, wherein the signal comprises a communication regarding the presence of the signal transmitting promoter being in the predetermined vicinity.

7. A system according to claim 6, wherein the communication is indicative of additional information selected from the group consisting of the type of article being promoted by the signal transmitting promoter, a given amount of articles being promoted by the signal transmitting promoter, a price range of articles being promoted by the signal transmitting promoter, rewards associated with the purchase of articles being promoted by the signal transmitting promoter and any combination thereof.

8. A system according to claim 5, wherein the predetermined vicinity is stored within the memory of the promoter controller.

9. A system according to claim 5, wherein the predetermined vicinity is stored within the memory of the main controller.

10. A system according to claim 5, wherein the main controller is provided by the execution of the respective processor executable code to perform a computer implementable step of receiving the signal being transmitted the potential target customer controllers by the promoters.

11. A system according to claim 10, wherein the main controller is provided by the execution of the respective processor executable code to perform the computer implementable step of transmitting the received signal to the potential target customers within the predetermined vicinity.

12. A system according to claim 11, wherein the signal comprises a communication regarding the presence of the signal transmitting promoter being in the predetermined vicinity.

13. A system according to claim 12, wherein the communication is indicative of additional information selected from the group consisting of a given amount of signal transmitting promoters within the predetermined vicinity, a predetermined ranking of the signal transmitting promoter or of each of the signal transmitting promoters in the given amount thereof; an amount of articles being promoted within the predetermined vicinity, a price range of articles being promoted within the predetermined vicinity, rewards associated with the purchase of articles being promoted within the predetermined vicinity and any combination thereof.

14. A system according to claim 5, wherein the merchant controller of step e) is in communication with an input/output merchant interface and wherein the promoter controller of step d) is in communication with an input/output promoter interface, wherein the main controller is provided by the execution of the respective processor executable code to perform the computer implementable step of superimposing the interface of the target customer controller that transmitted the captured marker to the main controller that resulted in the matching of step b) on the merchant interface and on the promoter interface for in tandem navigation thereof and for target customer inputs via the target customer interface.

15. A system according to claim 14, wherein the promoter controller of step d) is provided by the execution of the respective processor executable code to perform the computer implementable step of storing article information in the memory thereof relative to the article promoted by the given promoter associated therewith, wherein the stored information comprises promoter reviews of the promoted article and sensor provided performance analysis of the promoted article.

16. A method for providing a network between merchants of articles, target customers for articles and promoters of articles purchased from the merchants, the method comprising:

providing a remote networked communication between a main controller with one or more merchants of articles, one or more promoters of articles and one or more target customers for articles;

physically associating one or more markers with articles purchased from the merchants for being displayed by the promoters, the markers being configured for being remotely captured when the associated article is displayed;

providing the target customers with the ability to selectively capture any of the markers when a given article physically associated therewith is displayed in a marker capturing proximity with a target customer;

providing for the target customer to transmit the captured marker to the main controller;

providing a respective databank for each of the merchants of articles sold thereby and of an association between a given purchased article purchased therefrom and a given merchant associated therewith and a given promoter;

communicating to the main controller which marker is transmitted thereto by which of the target customers;

communicating to the main controller which of the markers are associated with which of the articles;

communicating to the main controller which of the articles are sold by which of the merchants;

communicating to the main controller which of the markers and which of the associated articles are associated with which of the promoters;

communicating to the main controller which of the articles are sold by which of the merchants;

the main controller providing for:
i. matching the captured marker transmitted thereto to a given article purchased by a given promoter;
ii. matching a target customer to the captured marker transmitted thereto;
iii. matching the given article matched to the captured marker to a given promoter;

providing for the merchant to selectively transmit a communication via the main controller to the target customer that transmitted the captured marker to the main controller that resulted in the matching of step (i);

providing for the target customer to receive the transmitted communication from the merchant to input requests via main controller based on the transmitted communication;

providing for the merchant to selectively transmit a communication to the promoter via the main controller based on the input request of the target customer.

17. A method according to claim 16, wherein the communication selectively transmitted to the target customer is selected from the group consisting of:
data regarding the article physically associated with the captured marker, wherein the data is contained within the databank provided by the merchant controller;
an offer to purchase an article contained in the databank of the articles sold by the merchant associated with the merchant controller selectively transmitting the communication, wherein the article contained in the databank is the same as, or similar to, or otherwise associated with the article physically associated with the captured marker;
a discount on the offer to purchase an article contained in the databank of the articles sold by the merchant associated with the merchant controller selectively transmitting the communication;
an offer for the target customer to input a given request; and
any combination thereof.

18. A method according to claim 16, wherein the communication transmitted by the merchant to the promoter is selected from the group consisting of:
communicating an allotment of points to the promoter;
communicating an allotment of monetary funds to the promoter;
communicating an allotment of virtual currency to the promoter; and
any combination of the foregoing.

19. A method according to claim 16, wherein the input request of the target customer is selected from the group consisting of:
a request for data regarding the article physically associated with the captured marker;
a request to purchase an article sold by the merchant;
a request to rate the article physically associated with the captured marker; and
any combination of the foregoing.

20. A method according to claim 16, wherein the promoter is provided with remotely signaling to potential target customers within a predetermined vicinity.

21. A method according to claim 20, wherein the step of remotely signaling comprises sending a communication regarding the presence of the signaling promoter being in the predetermined vicinity.

22. A method according to claim 21, wherein the communication is indicative of additional information selected from the group consisting of the type of article being promoted by the signaling promoter, a given amount of articles being promoted by the signaling promoter, a price range of articles being promoted by the signaling promoter, rewards associated with the purchase of articles being promoted by the signaling promoter and any combination thereof.

23. A method according to claim 21, wherein the communication is modulated so as to indicate information selected from the group consisting of a given number of signaling promoters within the predetermined vicinity, a predetermined ranking of the signaling promoter or of each of the signaling promoters in the given number thereof; an amount of articles being promoted within the predetermined vicinity, a price range of articles being promoted within the predetermined vicinity, rewards associated with the purchase of articles being promoted within the predetermined vicinity and any combination thereof.

24. A method according to claim 16, further comprising the step of providing for the promoter to remotely provide the target customer with selectively accessible information relative to the article promoted by the promoter associated therewith, wherein the selectively accessible information comprises promoter reviews of the promoted article and sensor provided performance analysis of the promoted article.

* * * * *